(12) United States Patent
Facklam et al.

(10) Patent No.: US 8,524,817 B2
(45) Date of Patent: Sep. 3, 2013

(54) PLASTICIZER PREPARATIONS WITH GOOD GELLING PROPERTIES

(75) Inventors: Thomas Facklam, Leverkusen (DE); Karsten Job, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 13/168,079

(22) Filed: Jun. 24, 2011

(65) Prior Publication Data

US 2012/0129991 A1 May 24, 2012

(30) Foreign Application Priority Data

Jul. 5, 2010 (EP) .................... 10168454

(51) Int. Cl.
*C08K 5/42* (2006.01)
*C09K 3/00* (2006.01)

(52) U.S. Cl.
USPC ....................... 524/158; 524/157; 252/182.17

(58) Field of Classification Search
USPC .............. 524/158, 157; 252/182.17
See application file for complete search history.

(56) References Cited

U.S. PATENT DOCUMENTS

| 7,205,349 | B2 | 4/2007 | Koch et al. | |
|---|---|---|---|---|
| 7,323,588 | B2 | 1/2008 | Grass et al. | |
| 7,629,413 | B2 | 12/2009 | Godwin et al. | |
| 8,026,314 | B2 | 9/2011 | Hansel et al. | |
| 2004/0015007 | A1* | 1/2004 | Grass et al. | 560/103 |
| 2004/0138358 | A1* | 7/2004 | Koch et al. | 524/297 |
| 2008/0004387 | A1 | 1/2008 | Weiss et al. | |
| 2008/0306190 | A1 | 12/2008 | Weiss et al. | |
| 2009/0197998 | A1 | 8/2009 | Weiss et al. | |
| 2010/0048778 | A1 | 2/2010 | Godwin et al. | |
| 2010/0093885 | A1* | 4/2010 | Hansel et al. | 523/100 |
| 2010/0298477 | A1 | 11/2010 | Godwin et al. | |

FOREIGN PATENT DOCUMENTS

| DE | 1962500 | 7/1960 |
|---|---|---|
| WO | 9739060 | 10/1997 |

OTHER PUBLICATIONS

European Search Report in corresponding application No. 10168454, Oct. 7, 2010 (4 pages).

* cited by examiner

*Primary Examiner* — Peter F Godenschwager
*Assistant Examiner* — Angela C Scott
(74) *Attorney, Agent, or Firm* — Michael A. Miller

(57) ABSTRACT

The present invention relates to plasticizer preparations based on benzoic ester with monohydric alcohols and aryl alkanesulphonates and use of these as plasticizers in plastics.

7 Claims, No Drawings

US 8,524,817 B2

PLASTICIZER PREPARATIONS WITH GOOD GELLING PROPERTIES

This application claims the benefit of European Application No. 10168454.6 filed Jul. 5, 2010.

FIELD OF THE INVENTION

The present invention relates to plasticizer preparations based on benzoic ester with monohydric alcohols and aryl alkanesulphonates and use of these as plasticizers in plastics.

BACKGROUND OF THE INVENTION

Plasticizers have been used for decades for the processing of plastics such as Polyvinyl chloride (PVC). Plasticizers are additives which are used in polymer processing and which improve processability, flexibility and extensibility. The plasticizers for producing flexible PVC are mainly phthalic esters, such as the all-purpose products di-2-ethylhexyl phthalate (DEHP), diisononyl phthalate (DINP) and diisodecyl phthalate (DIDP). Rapid-gelling plasticizers, such as the short-chain phthalates dibutyl phthalate (DBP), diisobutyl phthalate (DiBP) and benzyl-n-butyl phthalate (BBP) can be added in order to improve the speed of the processes or to reduce the amount of energy that they consume.

The use of phthalates generally, and in particular the use of the rapid-gelling phthalates based on alcohols with a carbon chain length of from 3 to 6, with no branching, is subject to continuously increasing restriction deriving from legal requirements. According to EU Directive 2005/84/EC, it is no longer permissible to use concentrations greater than 0.1% of the plasticizers diisononyl phthalate (DINP), diisodecyl phthalate (DIDP) and di-n-octyl phthalate (DnOP) to produce toys and baby products which could be placed in children's mouths. The use of concentrations greater than 0.1% of di-2-ethylhexyl phthalate (DEHP), dibutyl phthalate (DBP) and benzyl butyl phthalate (BBP) in toys and baby products is forbidden. The phthalates dibutyl phthalate (DBP), diisobutyl phthalate (DiBP), benzyl butyl phthalate (BBP) and di(2-ethylhexyl) phthalate (DEHP) have been added to the list of candidates for classification as substances of very high concern (SVHC) by the European Chemicals Agency (ECHA).

With respect to the abovementioned rapid gelling, there is a need for a phthalate-free replacement material for the rapid-gelling phthalates and in particular for the blends of these with all-purpose plasticizers.

EP 1 983 024 A1 proposes benzyl alkyl trimellitates as rapid-gelling ester mixtures. The ester mixtures were obtained directly in a one-pot reaction. No study of the individual components was carried out; no particular advantages of the mixture over the individual components have been described.

EP 2 039 718 A2 describes rapid-gelling plasticizer mixtures based on aryl alkylsulphonate and on diol dibenzoates. The particular property of these plasticizer mixtures is low volatility. According to the examples, addition of the rapid-gelling diol dibenzoates to the aryl alkylsulphonate leads to more rapid gelling than the aryl alkylsulphonate alone; the gel time achieved was not shorter than that of the individual components, i.e. the diol dibenzoate in this case.

EP 2 145 914 A1 describes the improvement of gelling properties of plasticizers through addition of triacetin.

WO 2006077131 A1 describes C9- to C10-alkyl benzoates as low-volatility viscosity reducers in PVC plastisols with standard plasticizers. Addition of the more rapid-gelling alkyl benzoates is described as giving a generally expected reduction in the solvation temperature of the standard plastisol formulation; there is no description of any significant reduction to a value below the results from the individual components.

WO 97/39060 A1 suggests the use of alkyl benzoates as processing aids in PVC pastes with standard plasticizers, and it is emphasized here that the alkyl benzoates do not have any material effect on the gelling properties.

The patents EP 1 415 978 A1 and EP 1 354 867 A2 propose the use of mixtures of isomeric decyl benzoates and of isomeric nonyl benzoates with dialkyl phthalate, dialkyl adipate or cyclohexanedicarboxylic ester, but no rapid gelling behaviour of the mixtures beyond that of the individual components was discovered.

WO 2009085453 A2 recommends rapid-gelling non-phthalate plasticizers for accelerating processing when using the slow-gelling cyclohexanecarboxylic esters, with the expected result of an appropriate acceleration.

Mixtures of benzoic esters have been known for a long time. In DE 1 962 500 A1, mixtures based on alkyl benzoate with succinic diesters exhibit excellent values for resistance to staining in the final flexible-PVC product.

However, the compositions described in the prior art do not satisfactorily meet the requirement for rapid processing and/or reduced energy consumption in processing.

The object of the present invention therefore consisted in finding novel phthalate-free plasticizer formulations with good gelling properties for plastics, in particular PVC, where these permit rapid processing and/or reduced energy consumption in processing.

Surprisingly, it has now been found that phthalate-free plasticizer preparations of a mixture of at least one aryl alkylsulphonate and of at least one ester of benzoic acid with monohydric C9- and C10-alcohols gel unexpectedly rapidly and have smaller gel times than the two individual components alone, and have smaller gel times than would be expected on the basis of a linear relationship involving the individual components.

SUMMARY OF THE INVENTION

The invention therefore provides phthalate-free plasticizer preparations comprising
a) from 5 to 95% by weight of an aryl alkylsulphonate of the formula $R^1$—$SO_2$—O—$R^2$ and
b) from 95 to 5% by weight of a benzoic ester with a monohydric alcohol of the formula $R^3$—C(O)O—$R^4$,
where the total of the percentages by weight of the components is 100% and where
$R^1$ is a straight-chain or branched C10- to C21-alkyl moiety,
$R^2$ is an optionally C1- to C4-alkyl-substituted phenyl moiety,
$R^3$ is a phenyl moiety and
$R^4$ is a straight-chain or branched C9- or C10-alkyl moiety.

For clarification, it should be noted that the scope of the invention encompasses all of the definitions and parameters listed in general terms or in preferred ranges below, in any desired combinations.

DESCRIPTION OF THE PREFERRED EMBODIMENTS

In one preferred embodiment, the content of the aryl alkylsulphonate to be used as component a) is from 20 to 80% by weight, particularly preferably from 33 to 67% by weight, very particularly preferably from 51 to 65% by weight, of alkylsulphonic ester (inclusive of terminal values).

Preferred content of component b) is correspondingly from 80 to 20% by weight, particularly preferably from 67 to 33%, very particularly preferably from 49 to 35% (inclusive of respective terminal values).

In one preferred embodiment, the moiety $R^2$ is unsubstituted phenyl moiety, and the aryl alkylsulphonate of the formula $R^1$—$SO_2$—$OR^2$ is therefore preferably phenyl alkylsulphonate, i.e. phenyl esters of alkanesulphonic acids, particularly preferably the product Mesamoll® from Lanxess Deutschland GmbH, Germany. Mesamoll® is composed of from 75 to 85% of a mixture of secondary phenyl alkylsulphonates, and also comprises from 15 to 25% of secondary diphenyl alkylsulphonates, and also from 0.05 to 3% of non-sulphated alkanes. Most of the alkyl chains here are unbranched, with chain lengths mainly in the range from C13 to C17.

It is preferable that $R^4$ is n-nonyl, isononyl, 3,5,5-trimethylhexanyl, n-decyl or isodecyl. It is particularly preferable that $R^4$ is isononyl, decyl or isodecyl, and it is very particularly preferable that it is low-3,5,5-trimethylhexanol-content isononanyl or 3,5,5-trimethylhexanyl.

In one preferred embodiment, $R^1$ is a straight-chain C10- to C21-alkyl moiety.

The plasticizer preparations of the invention can be produced via mixing, in the stated ratio, of the alkylsulphonic esters of component a) which are known per se with components b) by a process known to the person skilled in the art. The mixture can also optionally be produced via separate metering into the mixing process during the production of the compounding composition. The plasticizer preparations are defined via the constitution, rather than via the nature of the process that produces the preparation.

The invention also encompasses the use of the plasticizer preparations of the invention alone or in combination with other plasticizers, and also, without restriction, with benzoic esters, in plastics, preferably polyvinyl chloride, vinyl-chloride-based copolymers, polyvinylidene chloride, polyvinyl acetals, polyacrylates, polyamides, polyurethanes, polylactides, polylactic acids, cellulose or its derivatives, rubber polymers, such as acrylonitrile-butadiene rubber, hydrogenated acrylonitrile-butadiene rubber, chloroprene rubber, chlorinated polyethylene, chlorosulphonylpolyethylene, ethylene-propylene rubber, acrylate rubber and/or epichlorohydrin rubber. Particular preference is given to polyvinyl chloride. The invention also provides plastics, preferably polyvinyl chloride, vinyl-chloride-based copolymers, polyvinylidene chloride, polyvinyl acetals, polyacrylates, polyamides, polyurethanes, polylactides, polylactic acids, cellulose or its derivatives, rubber polymers, such as acrylonitrile-butadiene rubber, hydrogenated acrylonitrile-butadiene rubber, chloroprene rubber, chlorinated polyethylene, chlorosulphonylpolyethylene, ethylene-propylene rubber, acrylate rubber and/or epichlorohydrin rubber, preferably polyvinyl chloride, characterized in that these comprise the plasticizer preparation comprising a) from 5 to 95% by weight of an aryl alkylsulphonate of the formula $R^1$—$SO_2$—O—$R^2$ and
b) from 95 to 5% by weight of a benzoic ester with a monohydric alcohol of the formula $R^3$—C(O)O—$R^4$, where the total of the percentages by weight of the components is 100% and where
$R^1$ is a straight-chain or branched C10- to C21-alkyl moiety,
$R^2$ is an optionally to C4-alkyl-substituted phenyl moiety,
$R^3$ is a phenyl moiety and
$R^4$ is a straight-chain or branched C9- or C10-alkyl moiety.

Processes for producing plasticized polyvinyl chloride are known, for example from L. Meier: "5 Weichmacher" [5 Plasticizers], in Gächter/Müller (Editors) Kunststoffadditive [Plastics Additives], 3rd Edition, p. 350 to p. 367, Hanser Verlag 1989/1990. The aryl alkylsulphonate and the benzoic ester can be used in the said process in the form of the previously produced plasticizer preparation or else in any desired manner independently of one another.

PVC grades that can be used are suspension PVC, bulk PVC, microsuspension PVC or preferably emulsion PVC. The amounts used of the plasticizer preparations of the invention are preferably from 10 to 200 parts for every 100 parts of plastic, preferably from 20 to 120 parts for every 100 parts of plastic, particularly preferably from 40 to 100 parts for every 100 parts of plastic.

The plastics equipped with the plasticizer preparations of the invention, in particular the polyvinyl chloride, can also comprise other suitable additives alongside the plasticizer preparations of the invention. Examples of these are further plasticizers, stabilizers, antioxidants, lubricants, fillers, pigments, flame retardants, light stabilizers, blowing agents, kickers, polymeric processing aids, impact modifiers, optical brighteners, antistatic agents or biostabilizers.

It is preferable to use the mixtures of the invention to produce plastisols, preferably plastisols based on PVC.

Preferred final products made of the plastics to which the plasticizer preparation has been admixed according to the invention are floor coverings, wall coverings synthetic leathers, inks, paints and other coatings, adhesives, sealants, adhesive components or sealant components. The present invention therefore also provides the use of the plasticizer preparations of the invention in the final products mentioned.

Because the plasticizer preparations of the invention have a short gel time, they can be processed surprisingly rapidly and efficiently.

The examples below do not restrict the scope of the invention, but illustrate the plasticizer preparations of the invention.

Determination of Solvation Temperature:

The substance to be tested (48.0 g) was weighed into a glass beaker with magnetic stirrer bar and thermometer. The glass beaker was placed on a heated magnetic stirrer in a holder between a lamp and a photocell. The change in the light transmission of the specimen was recorded by way of a photocell. 2 g of polyvinyl chloride (Vinnolit® S4170; Vinnolit GmbH & Co. KG, Germany) were added, and 2 drops of PVC stabilizer (organotin stabilizer) were added by means of a pipette. The polyvinyl chloride was stirred into the plasticizer and rapidly heated to 100° C. at from 5 to 8° C. per minute, with stirring, and then further heated at an average rate of 3° C. per minute. The solvation temperature is considered to have been reached when the photocell recorded no further rise at all in the transmission value for 3 successive minutes, and the polyvinyl chloride had been dissolved. The test was terminated when the temperature of the contents of the glass beaker reached 200° C. A low solvation temperature under 135° C. indicated good compatibility of the plasticizer and of the plasticizer preparations with polyvinyl chloride.

Determination of Gel Time:

Gel time was determined from time-dependent viscosity measurements. The viscosity of a plastisol under shear was measured here by means of a plate-on-plate rotation viscosimeter (Physika MC 120, Anton Paar Germany GmbH, Germany) as a function of time at an elevated temperature. The elevated temperature depends on the gelling rate of the plasticizer and is preferably in the range from 50° C. to 150° C. (inclusive of terminal values). In order to obtain comparable data on gel time, viscosity was recorded after 120 seconds and 240 seconds at 70° C. and, respectively, after 60 seconds and 90 seconds at 80° C. High viscosities and rapid gelling indicate a high gelling rate.

The plastisol was produced by mixing 100% by weight of polyvinyl chloride (Vestolit® B 7021 Ultra, Vestolit GmbH & Co. KG, Germany) with 60% by weight of plasticizer and, respectively, plasticizer preparation and 3% by weight of PVC stabilizer (Ca/Zn carboxylate) in a paste evacuating device (Mathis LPE, Werner Mathis AG, Switzerland) for 5 minutes, and the material was aged at 20° C. for 24 hours prior to determination of gel time.

Vestolit® B 7021 Ultra is a pasteable homopolymeric micro SPVC which is suitable for producing low-viscosity pastes with approximately Newtonian rheology.

The properties of the product permit universal use thereof for compact and foamed coatings of any type, and also for dip-coating processes and casting processes.

Vestolit® B 7021 Ultra can be used wherever low viscosity, good storage stability and low water absorption are required. The product is particularly suitable for rotational processes, dip-coating processes and casting processes. The product is also suitable for the chemical foam found in synthetic leathers and in floor coverings. In the production of CV coverings, the good contact gelability leads to smooth surfaces in the glass non-woven impregnation process. Vestolit® B7021 Ultra can moreover be processed in the mechanical foaming process not only with soap stabilizers but also with silicone stabilizers (see Vestolit® B 7021 Ultra product data dated 06-04-12 (12 Apr. 2006).

EXAMPLES

In the examples, the solvation temperature of the individual plasticizers and of the plasticizer preparations is listed in order to demonstrate the compatibility of the plasticizers with the plastics or polymers, in this case PVC. A low solvation temperature of below 135° C. indicates good compatibility of the plasticizer and of the plasticizer preparations with polyvinyl chloride.

In order to obtain comparable gel time data, viscosity was recorded after fixed storage times at a constant storage temperature. High viscosities and gelling indicate high gelling rate.

TABLE 1

| | Inventive example | | | | |
|---|---|---|---|---|---|
| | 1* | 2 | 3 | 4 | 5* |
| Mesamoll ®[1] | 0% | 33% | 50% | 67% | 100% |
| 3,5,5-Trimethylhexyl benzoate | 100% | 67% | 50% | 33% | 0% |
| Solvation temperature [° C.] | 129 | 125 | 124 | 124 | 120 |
| Paste viscosity (Pas) after storage | | | | | |
| 70° C./120 seconds of residence time | 15.7 | 24.7 | 24.4 | 19.4 | 14.5 |
| 70° C./240 seconds of residence time | 88.8 | 240.0 | 293.0 | 258.0 | 155.0 |
| 80° C./60 seconds of residence time | 22.8 | 75.4 | 47.9 | 39.4 | 34.4 |
| 80° C./90 seconds of residence time | 166.0 | 787.0 | 595.0 | 524.0 | 440.0 |

[1]Mesamoll ® from Lanxess Deutschland GmbH, Germany, CAS Number 91082-17-6

TABLE 2

| | Inventive example | | | | |
|---|---|---|---|---|---|
| | 6* | 7 | 8 | 9 | 5* |
| Mesamoll ® | 0% | 33% | 50% | 67% | 100% |
| Isononyl benzoate[2] | 100% | 67% | 50% | 33% | 0% |
| Solvation temperature [° C.] | 127 | 122 | 122 | 122 | 120 |
| Paste viscosity (Pas) after storage | | | | | |
| 70° C./120 seconds of residence time | 48.3 | 279.0 | 234.0 | 121.0 | 14.5 |
| 70° C./240 seconds of residence time | 791.0 | solid | solid | solid | 155.0 |
| 80° C./60 seconds of residence time | 296.0 | 684.0 | solid | 372.0 | 34.4 |
| 80° C./90 seconds of residence time | solid | solid | solid | solid | 440.0 |

[2]Vestinol ® INB from OXENO Olefinchemie GmbH, Germany, CAS Number 670241-72-2.

TABLE 3

| Inventive example | Mesamoll ® | Decyl benzoate | Isodecyl benzoate[3] | Solvation temperature [° C.] | Viscosity (Pas) 70° C./120 s |
|---|---|---|---|---|---|
| 10* | 0% | 100% | 0% | 137 | 11.4 |
| 11 | 33% | 67% | 0% | 128 | 30.9 |
| 12 | 50% | 50% | 0% | 123 | 35.3 |
| 13 | 67% | 33% | 0% | 123 | 30.6 |
| 5* | 100% | 0% | 0% | 120 | 14.5 |
| 14* | 0% | 0% | 100% | 133 | 9.6 |
| 15 | 33% | 0% | 67% | 127 | 20.3 |
| 16 | 50% | 0% | 50% | 123 | 24.8 |
| 17 | 67% | 0% | 33% | 122 | 20.4 |

[3]Benzoflex ® 131 from Genovique Specialties Corporation, USA, CAS Number 131298-44-7.

The inventive examples show that, after heat-ageing for a defined period, the viscosities of the plastisols based on the plasticizer preparations of the invention are surprisingly higher than those of the individual components and than would be expected from a linear relationship involving the individual components. At the same time, it is found that the viscosity rise occurs more rapidly. Surprisingly, therefore, the use of the plasticizer preparations of the invention achieves a shorter gel time.

Tables 4 and 5 list comparative examples using phthalate-free plasticizer preparations which are compatible with PVC but are not of the invention, comprising the aryl alkylsulphonate (Mesamoll® from Lanxess Deutschland GmbH) and benzoic ester with monohydric alcohols having shorter (C8) and longer (C12) alkyl moieties. Here, the viscosities of the pastes after heat-ageing for a particular period, and the viscosity rises for the pastes as a function of time for the plasticizer preparations lie between the results for the individual components. The low solvation temperature in PVC of below 135° C. indicates that these mixtures can likewise be used in any ratio as plasticizers for plastics, in particular for PVC, as is generally the case with plasticizer mixtures based on benzoic esters of monohydric alcohols and on aryl alkanesulphonates.

Comparataive Examples

TABLE 4

| | 18* | c1* | c2* | c3* | 5* |
|---|---|---|---|---|---|
| Mesamoll ® | 0% | 33% | 50% | 67% | 100% |
| Ethylhexyl benzoate | 100% | 67% | 50% | 33% | 0% |
| Solvation temperature [° C.] | 121 | 119 | 119 | 119 | 120 |
| Paste viscosity (Pas) after storage | | | | | |
| 70° C./120 seconds of residence time | 1000.0 | 681.0 | 438.0 | 169.0 | 14.5 |
| 70° C./240 seconds of residence time | solid | solid | solid | solid | 155.0 |

TABLE 4-continued

|  | 18* | c1* | c2* | c3* | 5* |
|---|---|---|---|---|---|
| 80° C./60 seconds of residence time | 2550.0 | 900.0 | 559.0 | 314.0 | 34.4 |
| 80° C./90 seconds of residence time | solid | solid | solid | solid | 440.0 |

TABLE 5

|  | 19* | c4* | c5* | c6* | 5* |
|---|---|---|---|---|---|
| Mesamoll ® | 0% | 33% | 50% | 67% | 100% |
| Dodecyl benzoate | 100% | 67% | 50% | 33% | 0% |
| Solvation temperature [° C.] | 149 | 134 | 129 | 127 | 120 |
| Paste viscosity (Pas) after storage |  |  |  |  |  |
| 70° C./120 seconds of residence time | 1.7 | 5.2 | 7.9 | 10.6 | 14.5 |
| 70° C./240 seconds of residence time | 3.3 | 17.5 | 39.9 | 74.7 | 155.0 |
| 80° C./60 seconds of residence time | 1.8 | 9.4 | 14.1 | 20.0 | 34.4 |
| 80° C./90 seconds of residence time | 5.6 | 31.2 | 77.8 | 166.0 | 444.0 |

What is claimed is:

1. A phthalate-free plasticizer preparation comprising
a) from 33 to 67% by weight of an aryl alkylsulphonate of the formula $R^1$—$SO_2$—O—$R^2$ and
b) from 67 to 33% by weight of a benzoic ester with a monohydric alcohol of the formula $R^3$—C(O)O—$R^4$, where the total of the percentages by weight of the components is 100% and where $R^1$ is a straight-chain or branched C10- to C21-alkyl moiety,
$R^2$ is an optionally C1- to C4-alkyl-substituted phenyl moiety,
$R^3$ is a phenyl moiety and
$R^4$ is a straight-chain or branched C9- or C10-alkyl moiety.

2. A phthalate-free plasticizer preparation according to claim 1, characterized in that the moiety $R^1$ is a straight-chain C10- to C21-alkyl moiety.

3. A phthalate-free plasticizer preparation according to claim 1, characterized in that the moiety $R^2$ is an unsubstituted phenyl moiety.

4. A phthalate-free plasticizer preparation according to claim 1, characterized in that $R^4$ is n-nonyl, isononyl, 3,5,5-trimethylhexanyl, n-decyl, or isodecyl.

5. A phthalate-free plasticizer preparation according to claim 1, characterized in that component b) is a benzoic ester wherein said mixture comprises benzoic esters having different $R^4$ moieties and $R^4$ is selected from the group consisting of n-nonyl, isononyl, 3,5,5-trimethylhexanyl, n-decyl, and isodecyl.

6. A phthalate-free plasticizer preparation according of claim 1, characterized in that the content of the alkylsulphonic ester to be used as component a) is from 20 to 80% by weight.

7. A plastic, comprising a plasticizer preparation according to claim 1.

* * * * *